(12) United States Patent
Matysiak et al.

(10) Patent No.: US 10,674,019 B2
(45) Date of Patent: Jun. 2, 2020

(54) METHODS AND SYSTEMS FOR ACCESSING TROUBLESHOOTING FUNCTIONS OF A MULTI-FUNCTION PRINTER THROUGH A MOBILE DEVICE

(71) Applicant: Kyocera Document Solutions Development America, Inc., Concord, CA (US)

(72) Inventors: Jacek Joseph Matysiak, Concord, CA (US); Dilinur Wushour, Concord, CA (US)

(73) Assignee: Kyocera Document Solutions Development America, Inc., Concord, CA (US)

( * ) Notice: Subject to any disclaimer, the term of this patent is extended or adjusted under 35 U.S.C. 154(b) by 11 days.

(21) Appl. No.: 15/936,736

(22) Filed: Mar. 27, 2018

(65) Prior Publication Data

US 2019/0306327 A1    Oct. 3, 2019

(51) Int. Cl.
*H04N 1/00* (2006.01)
*H04L 12/58* (2006.01)
*G06F 3/12* (2006.01)

(52) U.S. Cl.
CPC ....... *H04N 1/00029* (2013.01); *G06F 3/1288* (2013.01); *H04L 51/046* (2013.01)

(58) Field of Classification Search
None
See application file for complete search history.

(56) References Cited

U.S. PATENT DOCUMENTS

| | | |
|---|---|---|
| 7,528,981 B2 | 5/2009 | Johnson et al. |
| 9,104,344 B2 | 8/2015 | Ganesan et al. |
| 9,432,527 B2 | 8/2016 | Park et al. |
| 2004/0126167 A1 | 7/2004 | Roosen et al. |
| 2006/0045544 A1 | 3/2006 | Kim et al. |
| 2006/0190537 A1 | 8/2006 | Morris |
| 2009/0207449 A1 | 8/2009 | Johnson et al. |
| 2009/0316174 A1* | 12/2009 | Kurahashi .......... G03G 15/5079 358/1.9 |
| 2010/0046015 A1 | 2/2010 | Whittle et al. |

(Continued)

OTHER PUBLICATIONS

U.S. Appl. No. 15/936,653, filed Mar. 27, 2018, Matysiak et al.
(Continued)

*Primary Examiner* — Mohammad H Ghayour
*Assistant Examiner* — Pawan Dhingra
(74) *Attorney, Agent, or Firm* — Sheridan Ross P.C.

(57) ABSTRACT

Embodiments of the disclosure provide for assisting with troubleshooting of a Multi-Function Printer (MFP) by receiving a text or voice message expressed in natural language from a user of the MFP, extracting text data or audio data of the received text or voice message, forwarding the extracted text data or audio data to one or more servers, receiving, from the servers, entities or intents related to the text or voice message based on processing of the text or audio data by the servers, processing the received entities or intents, sending information indicating one or more errors to the servers, receiving, from the servers, troubleshooting information directed to the errors, and providing at least a portion of the received troubleshooting information to the user of the MFP through the mobile device of the user of the MFP.

10 Claims, 6 Drawing Sheets

(56) References Cited

U.S. PATENT DOCUMENTS

| | | |
|---|---|---|
| 2012/0218589 A1 | 8/2012 | Watanabe et al. |
| 2014/0320888 A1 | 10/2014 | Baek et al. |
| 2015/0055171 A1 | 2/2015 | Joo et al. |
| 2015/0172505 A1* | 6/2015 | Park .................. H04N 1/00307 358/1.15 |
| 2015/0227447 A1* | 8/2015 | Adachi .............. G06F 11/3409 358/1.14 |
| 2016/0050263 A1 | 2/2016 | Hwang et al. |
| 2016/0050326 A1 | 2/2016 | Lee et al. |
| 2016/0070273 A1 | 3/2016 | Caskey et al. |
| 2016/0330336 A1 | 11/2016 | Park et al. |
| 2018/0075254 A1 | 3/2018 | Reid et al. |

OTHER PUBLICATIONS

U.S. Appl. No. 15/936,701, filed Mar. 27, 2018, Matysiak et al.
Official Action for U.S. Appl. No. 15/936,653, dated Oct. 9, 2018, 14 pages.
Official Action for U.S. Appl. No. 15/936,701, dated Nov. 30, 2018, 17 pages.

* cited by examiner

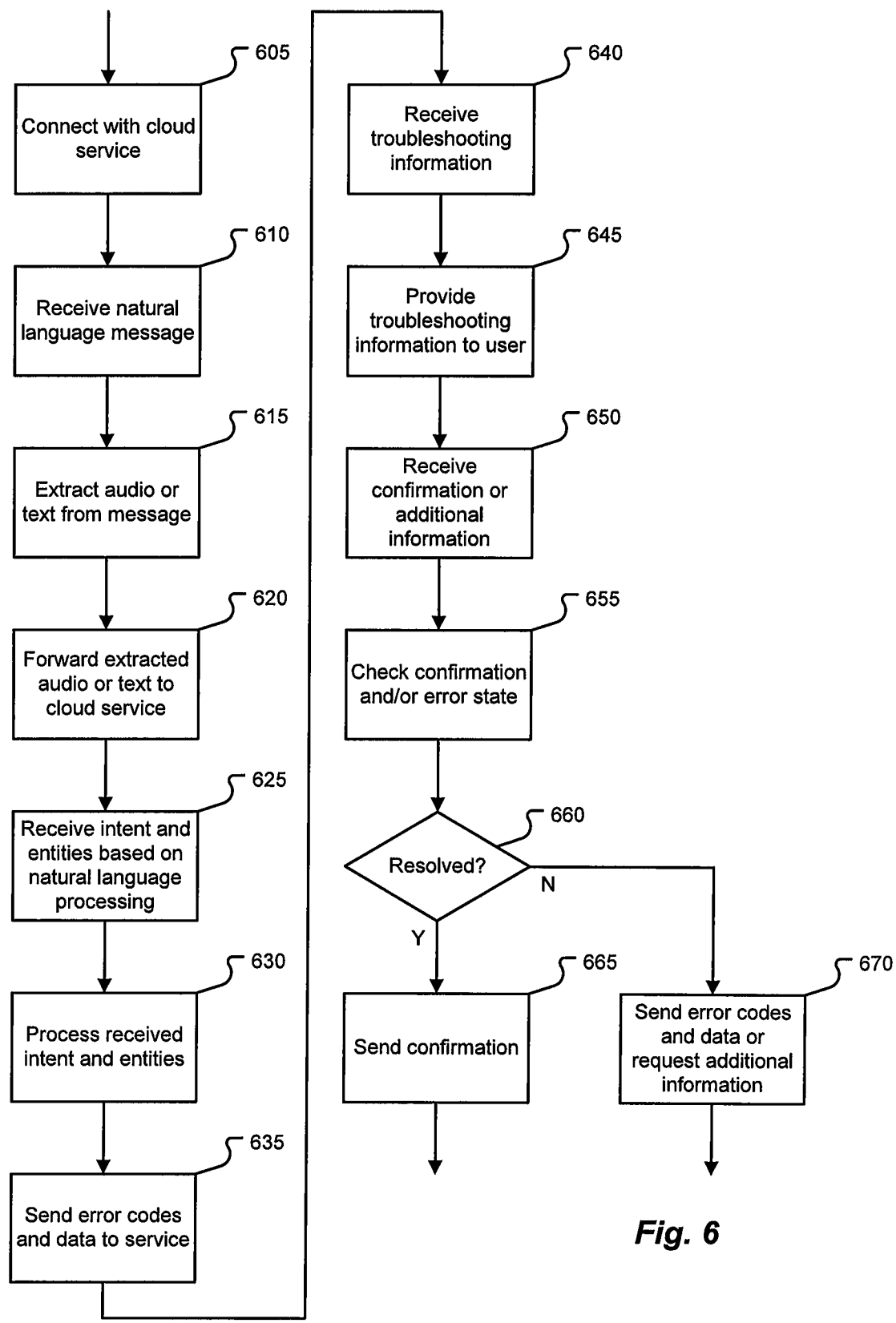

METHODS AND SYSTEMS FOR ACCESSING TROUBLESHOOTING FUNCTIONS OF A MULTI-FUNCTION PRINTER THROUGH A MOBILE DEVICE

FIELD OF THE DISCLOSURE

Embodiments of the present disclosure relate generally to methods and systems for accessing troubleshooting functions of a Multi-Function Printer (MFP) and more particularly to providing natural language access and control of the troubleshooting functions of the MFP through a chat session conducted via a mobile device.

BACKGROUND

Multi-Function Printers (MFPs) are common and well-known pieces of office equipment and can be found in most, if not all, offices and libraries, and even in many homes. These devices can offer the ability to print, scan, fax, and otherwise process documents in a wide variety of formats and in a number of different ways, e.g., one-sided or two-sided printing or scanning, color or grey-scale printing or scanning, printing or scanning with various levels of resolution, etc. In order to control these and numerous other functions that an MFP typically provides, a user usually accesses and manipulates a control panel on the device. The control panel can include a number of physical buttons or switches and/or a display which may be, in some cases, a touch display through which the user can select functions, settings for those functions, etc.

When the MFP malfunctions, this display can also provide error codes and other messages indicating a problem. Typically, the user then places a service call, consults a paper or electronic user manual, submits a request through a customer support website etc. in an attempt to troubleshoot the problem. In some cases, the MFP can provide onboard diagnostics accessible through the control panel. However, these functions typically require the user to navigate through a series of menus and make selections using the buttons of the control panel or by touching the display if it is a touch sensitive device. Considering the potential complexity of such menus, navigation can be a daunting, time-consuming task which can be frustrating and confusing for the user. Hence, there is a need for improved methods and systems for accessing troubleshooting functions of an MFP.

BRIEF SUMMARY

According to one embodiment, an MFP can comprise a processor and a memory coupled with and readable by the processor. The memory can have stored therein a set of instructions which, when executed by the processor, causes the processor to assist with troubleshooting of the MFP by connecting via a network with one or more servers providing a cloud service and receiving, from one or more servers, a text or voice message from a user of the MFP. The text or voice message can be expressed in natural language and can be previously received by the one or more servers from a mobile device of the user of the MFP. Text data or audio data of the received text or voice message can be extracted and forwarded to the one or more servers. In response, one or more entities or intents can be received from the one or more servers. The entities or intents can be related to the text or voice message from the user and can be based on processing of the text data or audio data by the one or more servers. The received one or more entities or intents can be processed and information indicating one or more errors can be sent to the one or more servers. In response, troubleshooting information directed to the one or more errors can be received from the one or more servers and at least a portion of the received troubleshooting information can be provided to the user of the MFP through the mobile device of the user of the MFP.

According to another embodiment, a system can comprise a mobile device, one or more servers communicatively coupled with the mobile device, and an MFP communicatively coupled with the mobile device and the one or more servers. The mobile device can send a natural language text or voice message to the one or more servers requesting initiation of one or more functions of the MFP. The one or more servers can receive the message from the mobile device, open a connection with the MFP, and forward the natural language text or voice message received from the mobile device to the MFP. The MFP can receive the natural language text or voice message forwarded from the one or more servers, extract text data or audio data of the text or voice message, and forward the extracted text data or audio data of the received text or voice message to the one or more servers. The one or more servers can receive the text data or audio data from the MFP, perform natural language processing on the text data or audio data to generate one or more entities or intents related to the voice or text message, and forward the generated one or more entities or intents to the MFP. The MFP can receive the one or more entities or intents from the one or more servers, process the one or more entities or intents, and provide to the one or more servers based on the one or more entities or intents information indicating one or more errors. The one or more servers can receive the information indicating the one or more errors, extract troubleshooting information directed to the one or more errors, and provide the troubleshooting information to the MFP. The MFP can receive the troubleshooting information from the one or more servers and provide at least a portion of the received troubleshooting information to the mobile device.

According to yet another embodiment, a method for troubleshooting the MFP can comprise receiving, by one or more servers, a natural language text or voice message from a mobile device, the text or voice message requesting initiation of one or more functions of the MFP. A connection with the MFP can be opened by the one or more servers and the natural language text or voice message received from the mobile device can be forwarded by the one or more servers to the MFP. The natural language text or voice message from the one or more servers can be received by the MFP. Text data or audio data of the text or voice message can be extracted by the MFP and the extracted text data or audio data of the received text or voice message can be forwarded by the MFP to the one or more servers. The text data or audio data from the MFP can be received by the one or more servers and natural language processing can be performed on the text data or audio data by the one or more servers to generate one or more entities or intents related to the voice or text message. The generated one or more entities or intents can be forward by the one or more servers and received by the MFP. The one or more entities or intents can then be processed and information indicating one or more errors based on the one or more entities or intents can be provided to the one or more servers by the MFP. The information indicating the one or more errors can be received by the one or more servers, troubleshooting information directed to the one or more errors can be extracted, and the troubleshooting information can be provided by the one or more servers to the MFP. The troubleshooting information from the one or more servers can be received by the MFP and at least a portion of the received troubleshooting information can be provided by the MFP to the mobile device.

BRIEF DESCRIPTION OF THE DRAWINGS

FIG. 6 is a flowchart illustrating exemplary local processes for accessing troubleshooting functions of a multi-function printer according to one embodiment of the present disclosure.

Figure 1:
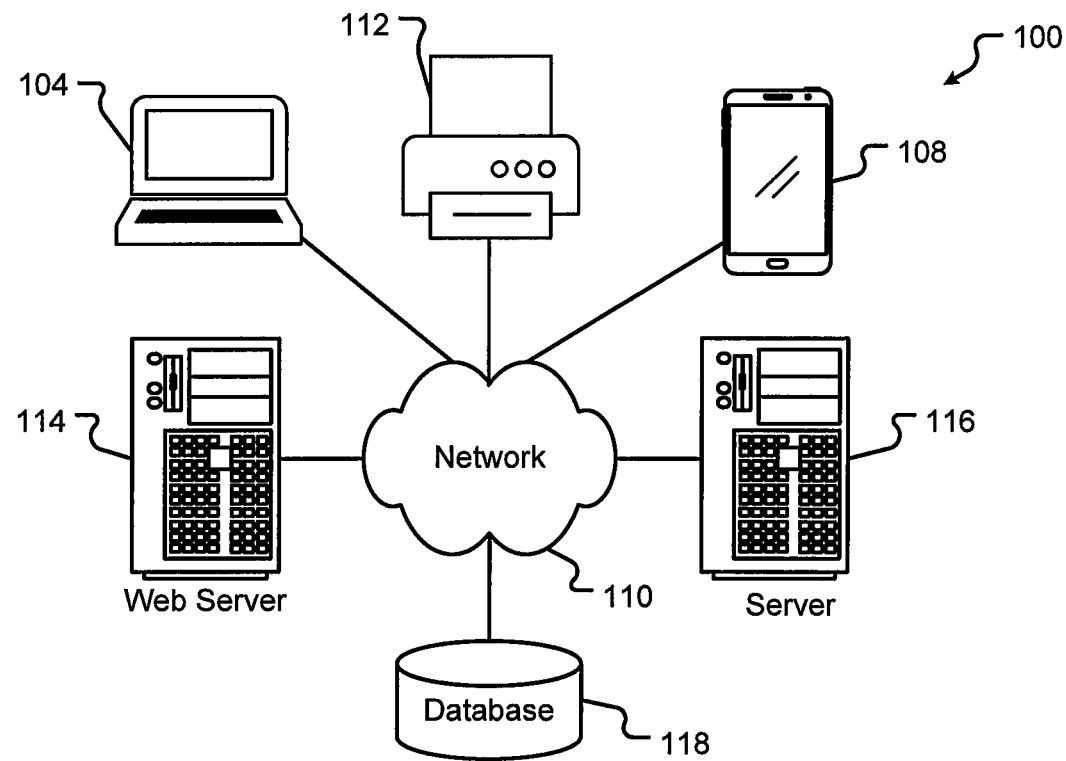
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices 104, 108, and 112, such as a computing device 104, a mobile device 108, and/or Multi-Function Printer (MFP) 112. The computing devices, such as computing device 104, may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. The computing devices 104, 108, and 112 may also have any of a variety of applications, including for example, database client and/or server applications, and web browser applications. Additionally, or alternatively, the computing devices, such as mobile device 108 may be any other electronic device, such as a thin-client computer, Internet-enabled mobile telephone, and/or personal digital assistant, capable of communicating via a network 110 and/or displaying and navigating web pages or other types of electronic documents. MFP 112 can comprise any of a variety of devices offering printing, scanning, copying, faxing, and/or other functions of processing documents. Examples of such devices can include, but are not limited to, the ECOSYS line of MFPs provided by KYOCERA Document Solutions Inc. Although the exemplary computer environment 100 is shown with two computing devices, any number of user computers or computing devices may be supported.

Environment 100 further includes a network 110. The network 110 can be any type of network familiar to those skilled in the art that can support data communications using any of a variety of commercially-available protocols, including without limitation SIP, TCP/IP, SNA, IPX, AppleTalk, and the like. Merely by way of example, the network 110 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP (Session Initiation Protocol) servers, HTTP(s) servers, FTP servers, CGI servers, database servers, Java servers, and the like. In some instances, the web server 114 may publish available operations as one or more web services.

The environment 100 may also include one or more file and/or application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server(s) 116, 114 may execute one or more web applications. The web application may be implemented as one or more scripts or programs written in any programming language, such as Java™, C, C #®, or C++, and/or any scripting language, such as Perl, Python, or TCL, as well as combinations of any programming/scripting languages. The application server(s) 114 or 116 may also include database servers, including without limitation those commercially available from Oracle®, Microsoft®, Sybase®, IBM® and the like, which can process requests from database clients running on a computing device 104, 108, 112.

The web pages created by the server(s) 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer devices 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a storage-area network ("SAN") familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to SQL-formatted commands.

Figure 2:
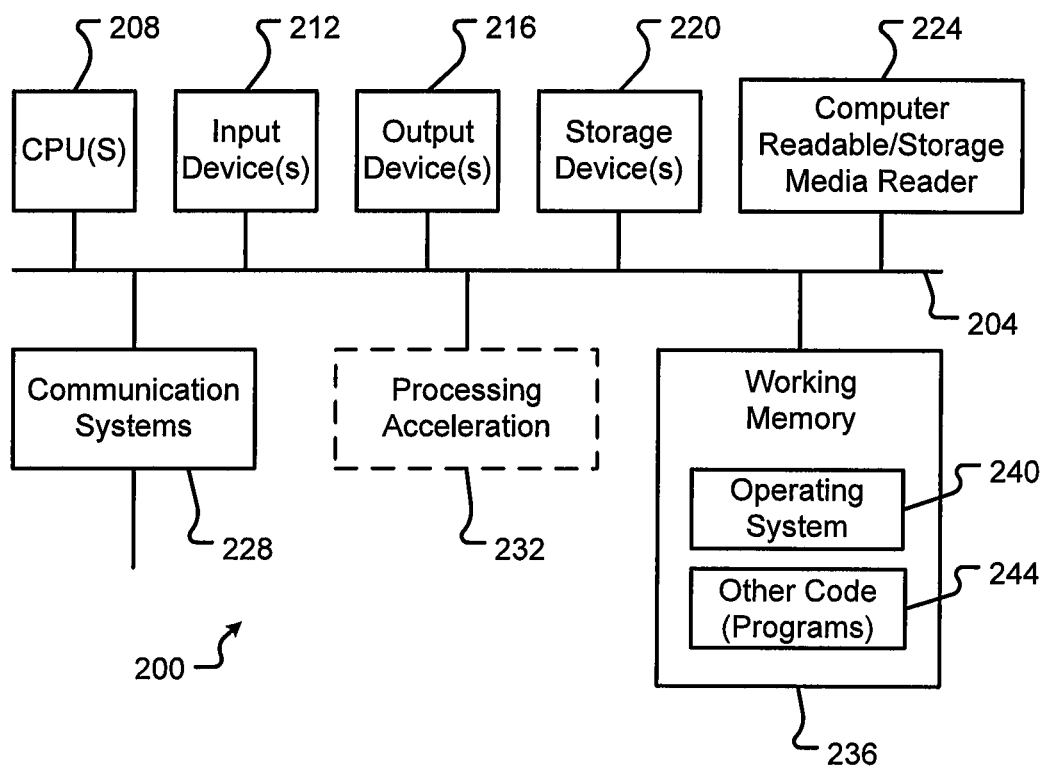
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices 104, 108, and 112, or other systems or components described above may be deployed or executed. The computer system 200 is shown comprising hardware elements that may be electrically coupled via a bus 204. The hardware elements may include one or more central processing units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a random-access memory ("RAM") and/or a read-only memory ("ROM"), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a DSP, a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including read-only memory (ROM), random-access memory (RAM), magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
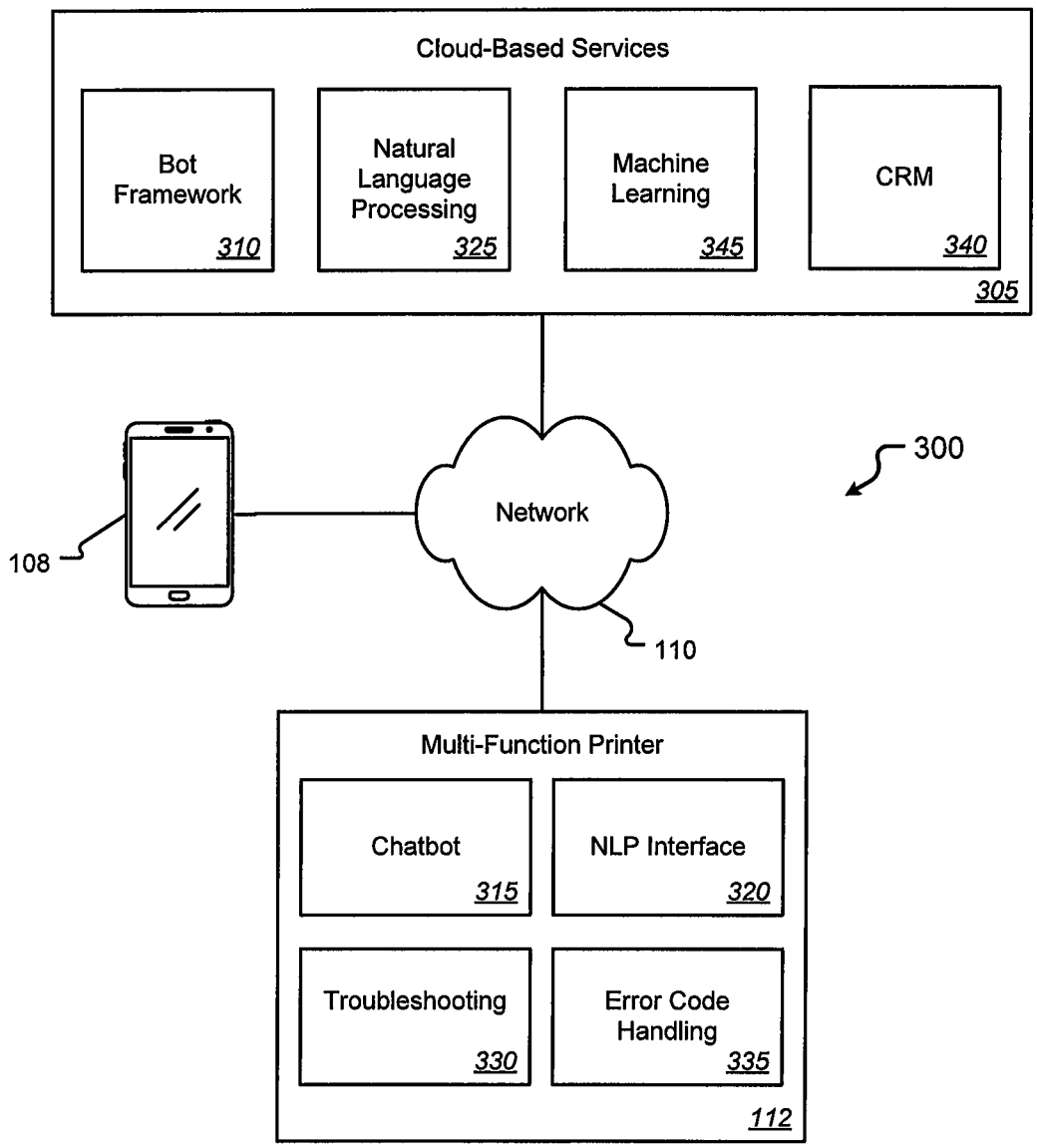
FIG. 3 is a block diagram illustrating components of a system for accessing troubleshooting functions of a multi-function printer according to one embodiment of the present disclosure.

FIG. 3 is a block diagram illustrating components of a system for accessing troubleshooting functions of a multi-function printer according to one embodiment of the present disclosure. As illustrated in this example, the system 300 can include a mobile device 108, communication network 110, and MFP 112 as introduced above. As noted, the mobile device 108 can comprise a cellular telephone, smartphone, tablet, or similar mobile device capable of communicating wirelessly with one or more communication networks to send and receive messages including but not limited to Short Message Service (SMS) and/or Multimedia Message Service (MMS) text messages, Instant Messages (IMs) voice messages, messages directed to or through various social media networks, data-based messages and exchanges, etc. The network 110 can include but is not limited to WiFi, cellular, any one or more wired and/or wireless local-area and wide-area networks, the Internet, etc. As also noted, MFP 112 can comprise any of a variety of devices offering printing, scanning, copying, faxing, and/or other functions of processing documents such as the ECOSYS line of MFPs provided by KYOCERA Document Solutions Inc, for example. The system can also include one or more cloud-based services executing on one or more servers 114 or 116 as described above also coupled with the network 110.

Generally speaking, embodiments of the present disclosure provide for simplified control of functions of the MFP. Functions of the MFP can include, but are not limited to, any one or more of printing, scanning, copying, faxing, etc. As noted above, the use of the conjunction "or" as used herein is intended to be inclusive and should not be considered to mean or imply a logical exclusive or condition. Rather, any reference made herein to functions of the MFP, such as printing and/or scanning, should be considered to include either or both of these functions as well as any other possible functions provided by the MFP, alone or in combination. Using the mobile device 108 a user can interact with the MFP 112 through a sequence of natural language text and/or voice messages. For example, the user can communicate through the mobile device 108 with the MFP 112 via a chat session, e.g., text message, voice, multiple-choice bubble, etc. Through such a chat session, the user can access functions of the MFP to simplify printing and scanning so that the user doesn't need to deal with MFP setup or navigate options. Additionally, or alternatively, a chat session can be conducted to access troubleshooting information and troubleshooting functions of the MFP 112. In such cases, the user can receive text, audio, and other information through the mobile device 108 to guide the user through steps to correct or avoid problems with the MFP 112. According to one embodiment, the MFP 112 can also send notifications such as impending toner cartridge replacement, low levels of paper, and error conditions to the user through the mobile device 108 and provide instructions for how to change the toner cartridge.

More specifically, the MFP 112 can further comprise a chatbot 315. As known in the art and as the term is used herein, a chatbot 315 is an application that, when executed by a processor such as found in the MFP 112, can simulate a natural conversation with a human user. The chatbot 315 of the MFP 112 can conduct such a conversation with the user of the MFP 112 over the network 110 and through the mobile device 108 of that user. The conversation can be text-based, e.g., SMS, MMS, IM, or similar messages, or voice-based, e.g., a voice call, and can be directed to accessing and controlling the functions of the MFP 112. In this way, the user can easily and naturally interact with and control the MFP 112 without the need to utilize the typical menu selections and other controls of the MFP 112 and, in some cases, without even being physically present at or near the MFP 112.

The cloud-based services 305 can execute one or more applications supporting these functions. For example, chatbots typically utilize natural language processing to conduct conversations with human users. This processing can be done by the MFP 112 or, in some cases, some or all of this processing may be performed by the cloud-based services 305. Accordingly, the cloud-based services 305 can, according to one embodiment, execute a bot framework 310 and/or one or more Natural Language Processing (NLP) applications 325 or functions. The NLP applications 325 can comprise any one or more applications or functions as known in the art and commonly used for processing and interpreting text data or audio data containing written or spoken expressions in a natural language form. The bot framework 310 can comprise one or more applications, functions, and/or interfaces to support interworking between the chatbot 315 and the NLP applications 325. Similarly, the MFP 112 may include one or more NLP interface 320 functions for interworking with the NLP applications 325 of the cloud-based services 305. In some cases, these functions 320 can pre-process text and/or voice messages, e.g., to extract text data or audio data from received messages and provide that data to the cloud-based services 305 for further processing by the NLP applications 325. It should be understood that, in other implementations, the NLP applications 325 may be executed locally by the MFP 112. In such cases, the cloud-based services 305 may not be implemented or may perform additional or different functions. Regardless of exactly where or how the NLP processing is performed, the chatbot 315 can allow the user to access and control functions of the MFP 112.

For example, an error may occur while using the MFP 112. In such cases, the user can request through the mobile device 108 information explaining the error and/or instructions on how to address and correct the error. Accordingly, the MFP 112 can further comprise one or more troubleshooting applications 330 and one or more error code handling functions 335. It should be understood that, while these components are illustrated and described separately here they may, in other implementation, comprise the same set of applications and/or functions. As will be described in greater detail below, the troubleshooting applications 330 and error code handling functions 335 can be accessed by the user of the MFP 112 through a chat session conducted with the mobile device 108 by the chatbot 315. In other words, the chatbot 315 running on MFP 112 as a service companion, can assist a user or a service person to simplify troubleshooting by providing communication via chat, e.g., text message, voice, multiple-choice bubble, etc. This chat session can provide notification of errors or predictions of future problems or maintenance requirements of the MFP 112 and interactive instructions to the user for how to address and correct those errors and requirements. For example, the chatbot 315 can provide through the chat session notification of known issues, e.g., toner replacement needed, and the user can be guided through fixing the issue by the chatbot 315. In another example, notification for predictions, e.g., there is an 80% chance your fuser needs to be replaced in the next month, and guidance for resolving that issue can be provided by the chatbot 315 through the chat session.

To support these functions, the cloud-based services can further comprise one or more Customer Relationship Management (CRM) applications 340. Generally speaking, and as known in the art, a CRM application 340 can comprise an application or suite of applications to help a business manage customer data and interactions. A common function of CRM applications 340 are to provide customer support for products and services provided by that business. This support can be based on a knowledgebase or other database of information and provided in a number of forms ranging from self-help type information, e.g., online manuals or FAQs, to interactive communications with a human agent. Accordingly, the troubleshooting applications 330, error code handling functions 335, and/or chatbot 315 can interface with the CRM application 340 to retrieve such information and present it to the user through the mobile device 108.

Additionally, in some cases, the cloud-based services 305 can comprise one or more machine learning applications 345. According to one embodiment, the machine learning applications 345 can monitor the information requested from and provided by the CRM application 340, build a history of that information based on particular users, MFPs, error codes, conditions, etc., and adjust that history or model over time to provide basis upon which insight can be gained and adjustments can be made when providing troubleshooting information. For example, the machine learning applications 345 can create a database to save error-codes and steps for fixing each error. Additionally, or alternatively, the machine learning applications 345 can create a usage history database to record past failures and the number of printed/scanned/copied pages for the MFP. This database of historical data can then be used to create models to predict when errors are likely to occur. In some cases, heuristics extracted based on this learning can be downloaded from the cloud-based services 305 into the MFP 112 for future predictions.

Whether they are generated by cloud-based services 305 or the MFP 112, these predictions can be used by the chatbot 315 to send notification to user when it is nearing the time to replace toner cartridges or perform other maintenance or to notify the user of other predicted, potential issues. In addition to notification, the chatbot 315 can also provide remedies which may also be derived from machine learning. As noted, the chatbot 315 can then provide the users with step by step instructions to solve the problem. For example, the troubleshooting application 330 and/or error code handling functions 335 can download troubleshooting instructions from the CRM application of the cloud-based services 305 based on the error code or specific keyword and the chatbot 315 can provide through the chat session with the mobile device 108 steps to be taken or recommended checkups/tests to perform in the form of text, images, and/or voice instructions.

As noted above, the mobile device 108 can comprise a cellphone, smart phone, tablet, or similar device. According to one embodiment, the mobile device 108 may comprise an Augmented Reality (AR) or Virtual Reality (VR) device such a HoloLens or similar headset, glasses, goggles, etc. When wearing or using such a device, the user of the MFP 112 can speak to enter voice commands to control the MFP 112. The chatbot 315 responses can be printed or presented onto the headset display or can be played out in audio/voice form. Therefore, the chatbot 315 of the MFP 112 can receive video or graphic information from the VR or AR device and the troubleshooting instructions or information can be provided to the user of the MFP 112 through the VR or AR device. In the case that video is received from the VR or AR device, constituent parts of the MFP 112 can be recognized by scanning and matching against a preexisting MFP part database as known in the art. Based on the recognized parts, graphics, video, text, or audio can be provided through the VR or AR device indicating instructions for performing troubleshooting steps, tests, etc. For example, a user or technician can, when wearing such a device, see the real MFP and holograms or images superimposed thereon by the mobile device 108. The holograms or images can guide the technician through fix scenarios step by step. The chatbot 315 can additionally or alternatively provide voice and/or text instruction for the different parts of the scenario. The chatbot 315 can therefore instruct the user how to proceed with maintenance or repairs, can understand questions posed by the user, and can provide answers to those questions based on learned information maintained locally or by the CRM application 340 and machine learning applications 345 of the cloud-based services.

According to one embodiment, if the database of troubleshooting information maintained by the MFP 112 or cloud-based services 305 does not have instructions for solving a particular current problem, a knowledge extraction process can be initiated to discover information and extract knowledge from different sources. For example, a web search for keywords related to the current question of problem can be initiated and the top 'n' results from selected search engines, e.g., general search or search of selected website domains, can be provided to the user. Additionally, or alternatively, a live chat, e.g., voice, text, video, etc., can be initiated with a human agent or other expert to get advice or get a second opinion.

Therefore, a technician or other user can easily solve a large portion of problems encountered by the MFP 112 using up-to-date instructions. This is easier than attempting to find data in a manual. The up-to-date instructions may be more detailed and accessible, e.g., via voice, than control-panel-based instructions. The ability to make predictions and provide notification of those predictions can also help reduce downtime that could slow or halt a business' functioning. As the knowledgebase keeps expanding through machine learning processes, the chatbot 315 can become an experienced technician, can shorten the time needed for troubleshooting, and can reduce unnecessary checking. The chatbot 315 could be sufficiently intelligent to make human technicians unnecessary in some cases as the user could, using instructions provided by the chatbot 315, perform tasks that would previously require a technician.

Figure 4:
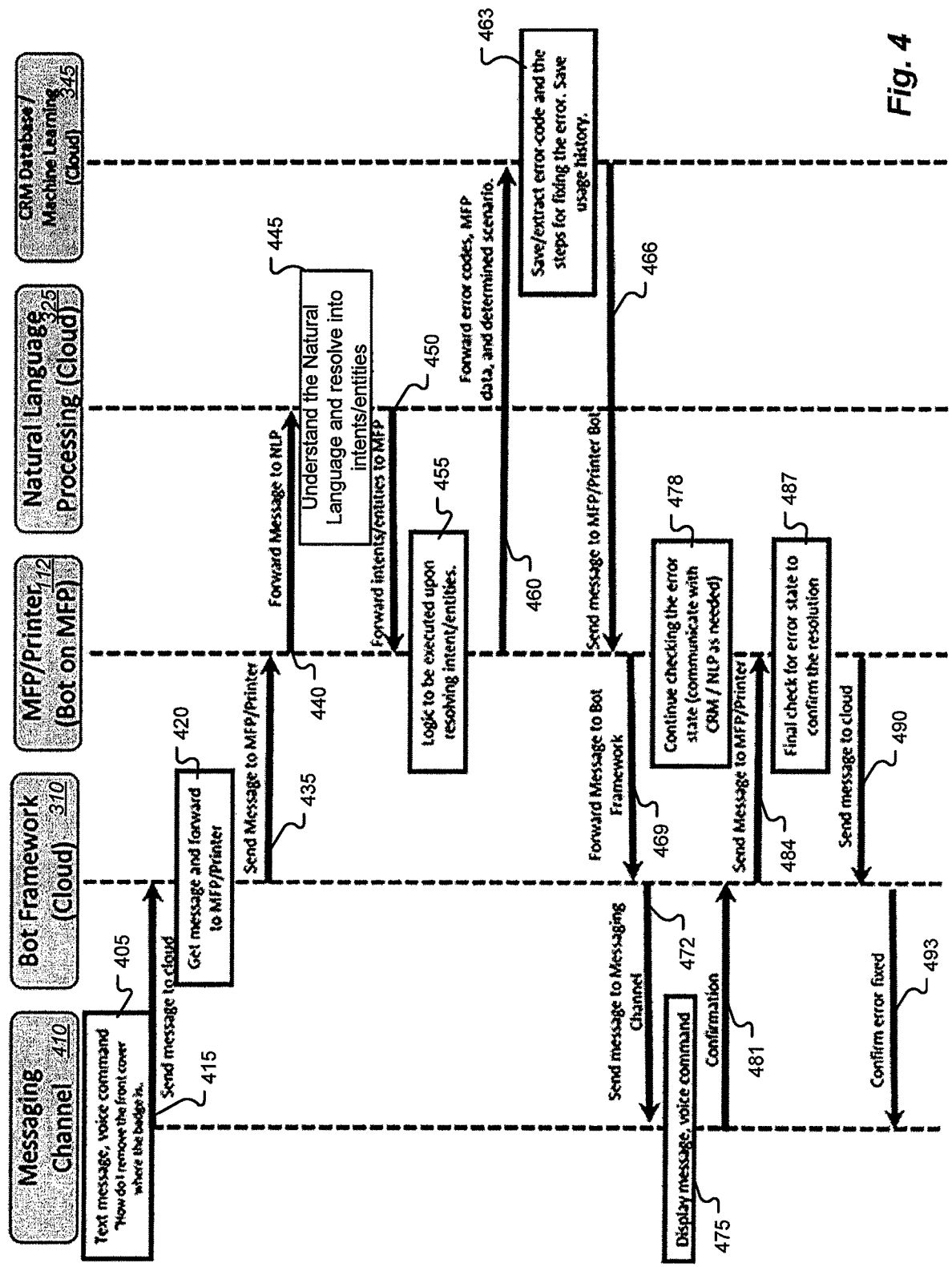
FIG. 4 is a timing diagram illustrating an exemplary process for accessing troubleshooting functions of a multi-function printer according to one embodiment of the present disclosure.

FIG. 4 is a timing diagram illustrating an exemplary process for accessing troubleshooting functions of an MFP according to one embodiment of the present disclosure. At step 405, as illustrated in this example, accessing functions of a multi-function printer can begin with a text or voice message on a messaging channel 410, e.g., sent from the mobile device 108 over the network 110. As noted above, the use of the conjunction "or" as used herein is intended to be inclusive and should not be considered to mean or imply a logical exclusive or condition. Rather, any reference made herein to text or voice messages should be considered to include either or both of text and/or voice, alone or in combination. At step 415, the message can be sent to the cloud-based services 305. At step 420, the message can be received by the bot framework 310 as described. At step 435, the bot framework can then send the received message to the chatbot 315 of the MFP 112.

The chatbot 315 can receive the text or voice message sent from the bot framework 310 of the cloud-based services 305 and process the message in a variety of different ways depending upon the exact implementation. At step 440, according to one embodiment, the chatbot 315 can forward the received message to the NLP applications 325 of the cloud-based services 305. In another embodiment, the chatbot 315 may perform some amount of processing on the received text or voice message such as, for example, extracting portions of text data or audio data from the message, before forwarding those portions to the NLP applications 325. In yet other embodiments, the MFP 112 may perform all NLP processing locally and thus, the text or voice message or text or audio data from the message does not need to be forwarded to NLP application 325 elsewhere.

At step 445, the NLP applications 325 can perform processing to understand the natural language expressed in the forwarded message and resolve the natural language into intents and entities. As known in the art and as used herein, intents can comprise information identifying an action the user wishes to perform or request, e.g., a command to be initiated, a function to be performed, etc. Also as known in the art and as used herein, entities can comprise information identifying, defining, or clarifying a subject of or context for an intent. Any of a variety of NLP techniques as known in the art can be used to recognize intents and entities expressed in the text data or audio data received from the MFP. At step 450, the entities and intents determined by the NLP applications 325 can then be forwarded to the chatbot 315 of the MFP 112.

At step 455, the MFP 112 can execute logic on the resolved entities and intents. For example, a function of the MFP 112 related to an identified intent can be initiated with parameters related to one or more identified entities. At step 460, the MFP 112 can forward information such as error codes or other information indicating errors or other conditions occurring on the MFP. This information can be forwarded to a CRM application 345 of the cloud-based services 305.

At step 463, the CRM applications 345 can save and/or extract the one or more errors, retrieve troubleshooting information directed to the one or more errors and save the error information and retrieved troubleshooting information in a usage history, etc. According to one embodiment, the CRM application 345 can perform applied machine learning on the history and the received information to improve the troubleshooting information retrieved. At step 466, the troubleshooting information can then be provided to the MFP 112.

Using the provided troubleshooting information, the MFP 112 can then conduct a dialog with the user through the chatbot 310 and messaging channel 410 to attempt to correct the problem. At step 469, the MFP 112 can, for example, provide the received troubleshooting information to the chatbot 310. At step 472, the chatbot 310 can, in turn, send a message containing some or all of the troubleshooting information through the messaging channel 410 to the mobile device 108. At step 475, this information can be presented to the user, e.g., displayed as text, images, video or played out as a voice message. The user can then use this information as a guide to correct the error. At step 478, the MFP 112 can continue to correct the error state and may, if the error is not resolved, further communicate error information to the CRM application for additional troubleshooting information to again be presented through the chatbot 310 and messaging channel 410 to the mobile device 108 of the user.

At step 481, upon resolution of the error, the user can indicate via a confirmation message through the mobile device 108 and messaging channel 410 that troubleshooting has been completed. At step 484, the chatbot can forward this message or an indication of this message to the troubleshooting functions of the MFP 112. At step 487, the troubleshooting functions of the MFP 112 can perform a check to confirm resolution of the error. At step 490, once confirmed, the MFP 112 can inform the chatbot 310. At step 493, the chatbot 310 can send a confirmation message to the mobile device 108 of the user through the messaging channel 410. Additionally, or alternatively, the MFP 112 may send a confirmation or indication of resolution to the CRM application.

Figure 5:
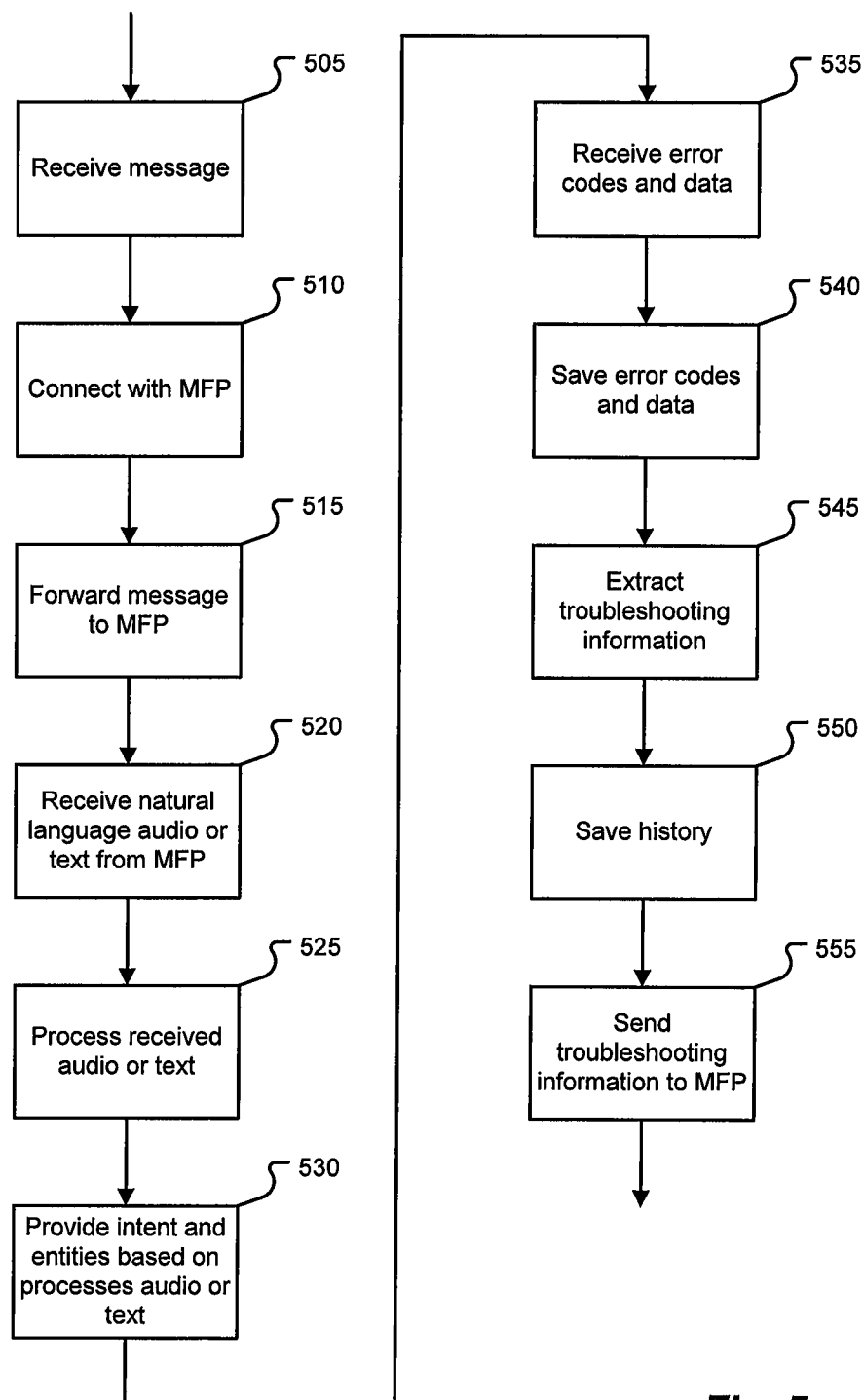
FIG. 5 is a flowchart illustrating exemplary cloud service processes for supporting access to troubleshooting functions of a multi-function printer according to one embodiment of the present disclosure.

FIG. 5 is a flowchart illustrating exemplary cloud service processes for supporting access to troubleshooting functions of an MFP according to one embodiment of the present disclosure. At step 505, as illustrated in this example, the one or more servers of the cloud service introduced above can receive a message from a mobile device. The message can comprise a natural language text or voice message to the one or more servers requesting initiation of one or more functions of the MFP. At step 510, and in response to receiving the message, the servers can open a connection with the MFP. At step 515, the server can forward the natural language text or voice message received from the mobile device to the MFP.

As noted above and as will be described further below, the MFP can extract and return text data or audio data of the text or voice message. Generally speaking, text data can comprise, for example, a text string corresponding to and including a command or request for troubleshooting functions of the MFP. Similarly, audio data can comprise an audio clip corresponding to and including such a command or request. At step 520, the one or more servers can receive the text data or audio data from the MFP. At step 525, the one or more servers can perform natural language processing on the text data or audio data to generate one or more entities or intents related to the voice or text message. At step 530, the one or more servers can forward or otherwise provide the generated one or more entities or intents to the MFP.

As introduced above, intents can comprise information identifying an action the user wishes to perform or request, e.g., a command to be initiated, a function to be performed, etc., while entities can comprise information identifying, defining, or clarifying a subject of or context for an action. So, for example, an intent can be "Change" and an entity might be "Toner." Also as known in the art, any of a variety of NLP techniques can be used to recognize intents expressed in the text data or audio data received from the MFP. For example, a trained neural network that maps words and phrases to ideas or topics may be utilized by the servers of the cloud service to identify an intent. Similarly, any of a variety of known techniques can be utilized for recognizing entities. For example, the servers can use a statistical model build on a training set and refined used to machine learning processes and that represents a mapping of words and phrases to categories, types, classifications, etc. used to assign entities.

At step 535, in response to the intents and entities and based on logic executed by the MFP, the one or more servers can receive information indicating one or more errors on the MFP. The information can comprise, for example, one or more error codes, a description of the error or problem provided by the user through the mobile device, a picture or video captured by a camera of the mobile device, etc. At step 540, the one or more servers can save the information indicating the one or more errors. At step 545, troubleshooting information directed to the one or more errors can be extracted. For example, troubleshooting information can be retrieved from a database of information, requested from a CRM application or system, etc. At step 550, using the saved error information and the extracted or retrieved troubleshooting information, the servers can build a history of error codes and the provided troubleshooting information and apply machine learning to the built history. Thus, the one or more servers can extract troubleshooting information directed to the one or more errors based on previously applied machine learning. At step 555, the troubleshooting information can then be provided to the MFP.

FIG. 6 is a flowchart illustrating exemplary local processes for accessing troubleshooting functions of an MFP according to one embodiment of the present disclosure. At step 605, accessing troubleshooting functions of the MFP can begin with connecting the MFP via a network with one or more servers providing a cloud service as described above. At step 610, once connected, a text or voice message expressed in natural language can be received from the one or more servers. As noted, the text or voice message can be received by the one or more servers from a mobile device of the user of the MFP and can include a natural language expression requesting access to or control of the printing and/or scanning functions of the MFP. At step 615, text data or audio data of the received text or voice message can be extracted from the message. At step 620, the extracted text data or audio data of the received text or voice message can be forwarded to the one or more servers for further processing. That is, portions of the natural language expression in the received text or voice message can be identified as relevant and/or particularly directed to access to or control of the printing and/or scanning functions of the MFP. This identification can be based, for example, on searching text, if any, of the received message for particular, predefined keywords, characters, or other indications of commands or requests to the MFP. Similarly, pre-processing of a voice message can comprise identifying keywords or utterances predefined as indicating a command or request to the MFP. Once identified, the corresponding text data, e.g., a text string corresponding to and including the command or request, or audio data, e.g., an audio clip corresponding to and including the command or request, can be copied or otherwise extracted from the received message and provided to the servers for further natural language and/or other processing.

At step 625, in response to the text data or audio data forwarded to the servers, the MFP can receive one or more entities and/or intents related to the text or voice message. As described above, the entities and/or intents can be based on natural language processing of the text data or audio data by the one or more servers. As noted, intents can comprise information identifying an action the user wishes to perform or request, e.g., a command to be initiated, a function to be performed, etc., while entities can comprise information identifying, defining, or clarifying a subject of or context for an action. So, for example, an intent can be "Change" and an entity might be "Toner." At step 630, the received the one or more entities and/or intents can be processed to initiate and perform the troubleshooting functions.

At step 635, initiating and performing the troubleshooting functions can comprise sending information indicating one or more errors to the one or more servers. At step 640, troubleshooting information directed to the one or more errors can be received from the one or more servers. At step 645, at least a portion of the received troubleshooting information can be provided to the user of the MFP through the mobile device of the user of the MFP. For example, providing the received troubleshooting information to the user of the MFP through the mobile device of the user of the MFP can comprise downloading troubleshooting instructions or information from the one or more servers based on the information indicating one or more errors or one or more keywords. In some cases, providing the received troubleshooting information to the user of the MFP through the mobile device of the user of the MFP can comprise providing, based on the downloaded troubleshooting instructions or information, one or more of text, video, audio, or images indicating steps to correct the one or more errors or collect additional information.

At step 650, assisting with troubleshooting of the MFP can further comprise receiving, from the mobile device of the user of the MFP, confirmation of the troubleshooting information or additional error information. At step 655, the received confirmation of the troubleshooting information or additional error information can be evaluated. At step 660, a determination can be made based on evaluating the received confirmation of the troubleshooting information or additional error information as to whether the one or more errors have been resolved. At step 665, in response to determining the one or more errors have been resolved, confirmation of resolution of the one or more errors can be sent to the one or more servers. At step 670, in response to determining the one or more errors have not been resolved, one or more additional error codes can be sent to the one or more servers requesting additional information from the one or more servers.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A Multi-Function Printer (MFP) comprising:
a processor; and
a memory coupled with and readable by the processor and having stored therein a set of instructions which, when executed by the processor, causes the processor to assist with troubleshooting of the MFP by:
connecting via a network with one or more servers providing a cloud service;
receiving, from one or more servers, a text or voice message from a user of the MFP, the text or voice message expressed in natural language and received by the one or more servers from a mobile device of the user of the MFP;
extracting text data or audio data of the received text or voice message;
forwarding the extracted text data or audio data of the received text or voice message to the one or more servers;
receiving, from the one or more servers, one or more entities or intents related to the text or voice message from the user based on processing of the text or audio data by the one or more servers;
processing the received one or more entities or intents;
sending information indicating one or more errors to the one or more servers;
receiving, from the one or more servers, troubleshooting information directed to the one or more errors;
providing at least a portion of the received troubleshooting information to the user of the MFP through the mobile device of the user of the MFP;
receiving, from the mobile device of the user of the MFP, confirmation of the troubleshooting information or additional error information;
evaluating the received confirmation of the troubleshooting information or additional error information;
determining, based on evaluating the received confirmation of the troubleshooting information or additional error information, whether the one or more errors have been resolved;
in response to determining the one or more errors have been resolved, sending confirmation of resolution of the one or more errors to the one or more servers; and
in response to determining the one or more errors have not been resolved, sending one or more additional error codes to the one or more servers or requesting additional information from the one or more servers, wherein a Customer Relationship Management (CRM) application executing on the one or more servers provides, to the mobile device of the user, additional troubleshooting information in response to the additional error codes or request for additional information.

2. The MFP of claim 1, further comprising providing through the mobile device of the user of the MFP notification of a predicted future maintenance requirement of the MFP.

3. The MFP of claim 1, further comprising providing through the mobile device of the user of the MFP notification of a predicted one or more problems with the MFP and one or more proposed remedies for each predicted problem.

4. The MFP of claim 1, wherein providing the received troubleshooting information to the user of the MFP through the mobile device of the user of the MFP further comprises downloading troubleshooting instructions or information from the one or more servers based on the information indicating one or more errors or one or more keywords.

5. The MFP of claim 4, wherein providing the at least a portion of the received troubleshooting information to the user of the MFP through the mobile device of the user of the MFP comprises providing, based on the downloaded troubleshooting instructions or information, one or more of text, video, audio, or images indicating steps to correct the one or more errors or collect additional information.

6. A method for troubleshooting a Multi-Function Printer (MFP), the method comprising:
    receiving, by one or more servers, a natural language text or voice message from a mobile device, the text or voice message requesting initiation of one or more functions of the MFP;
    opening, by the one or more servers, a connection with the MFP;
    forwarding, by the one or more servers, the natural language text or voice message received from the mobile device to the MFP;
    receiving, by the MFP, the natural language text or voice message from the one or more servers;
    forwarding, by the MFP to the one or more servers, text or audio data from the received text or voice message;
    receiving, by the one or more servers, the text or audio data from the MFP;
    performing, by the one or more servers, natural language processing on the text or audio data to generate one or more entities or intents related to the voice or text message;
    forwarding, by the one or more servers, the generated one or more entities or intents to the MFP;
    receiving, by the MFP, the one or more entities or intents from the one or more servers;
    providing, by the MFP to the one or more servers, information indicating one or more errors based on the one or more entities or intents;
    receiving, by the one or more servers, the information indicating the one or more errors;
    extracting, by the one or more servers, troubleshooting information directed to the one or more errors;
    providing, by the one or more servers, the troubleshooting information to the MFP;
    receiving, by the MFP, the troubleshooting information from the one or more servers;
    providing, by the MFP to the mobile device, at least a portion of the received troubleshooting information;
    receiving, by the MFP from the mobile device, confirmation of the troubleshooting information or additional error information;
    evaluating, by the MFP, the received confirmation of the troubleshooting information or additional error information;
    determining, by the MFP, based on evaluating the received confirmation of the troubleshooting information or additional error information, whether the one or more errors have been resolved;
    in response to determining the one or more errors have been resolved, sending, by the MFP, confirmation of resolution of the one or more errors to the one or more servers;
    in response to determining the one or more errors have not been resolved, sending, by the MFP, one or more additional error codes to the one or more servers or requesting additional information from the one or more servers; and
    sending, by a Customer Relationship Management (CRM) application executing on the one or more servers to the mobile device, additional troubleshooting information in response to the additional error codes or request for additional information.

7. The method of claim 6, further comprising:
    saving, by the one or more servers, the information indicating the one or more errors;
    building, by the one or more servers, a history of error codes and the provided troubleshooting information; and
    applying, by the one or more servers, machine learning to the built history, wherein extracting troubleshooting information directed to the one or more errors is based on previously applied machine learning using a statistical model built on a training set and refined using the machine learning processes, wherein the statistical model represents a mapping of words and phrases to categories, types, and classifications used to assign entities.

8. The method of claim 7, further comprising providing, by the one or more servers, notification of a predicted future maintenance requirement of the MFP or a predicted one or more problems with the MFP and one or more proposed remedies for each predicted problem based on the built history and applied machine learning.

9. The method of claim 6, further comprising:
    receiving, by the MFP from the mobile device, information indicating confirmation of the troubleshooting information or additional error information;
    evaluating, by the MFP, the received confirmation of the troubleshooting information or additional error information;
    determining, by the MFP, based on evaluating the received confirmation of the troubleshooting information or the additional error information, whether the one or more errors have been resolved;
    in response to determining the one or more errors have been resolved, sending, by the MFP, confirmation of resolution of the one or more errors to the one or more servers; and
    in response to determining the one or more errors have not been resolved, sending, by the MFP, one or more additional error codes or requests for additional information to the one or more servers.

10. The method of claim 9, wherein the one or more servers receive the one or more additional error codes or requests for additional information and perform a search for additional information directed to the additional error codes or requests for additional information and initiate a chat session with a human agent.

* * * * *